United States Patent
Kang et al.

(10) Patent No.: US 11,543,975 B2
(45) Date of Patent: Jan. 3, 2023

(54) STORAGE DEVICE AND METHOD OF OPERATING THE SAME

(71) Applicant: SK hynix Inc., Gyeonggi-do (KR)

(72) Inventors: Ji Yeun Kang, Gyeonggi-do (KR); Won Hyoung Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/308,232

(22) Filed: May 5, 2021

(65) Prior Publication Data

US 2022/0137836 A1 May 5, 2022

(30) Foreign Application Priority Data

Nov. 2, 2020 (KR) .......................... 10-2020-0144654

(51) Int. Cl.
*G06F 11/07* (2006.01)
*G06F 3/06* (2006.01)
*G06F 1/28* (2006.01)
*G06F 11/14* (2006.01)

(52) U.S. Cl.
CPC .............. *G06F 3/0619* (2013.01); *G06F 1/28* (2013.01); *G06F 3/064* (2013.01); *G06F 3/0652* (2013.01); *G06F 3/0679* (2013.01); *G06F 11/0772* (2013.01); *G06F 11/1435* (2013.01)

(58) Field of Classification Search
CPC ............. G06F 11/0772; G06F 11/1435; G06F 3/0619

USPC ........................................................ 714/6.11
See application file for complete search history.

(56) References Cited

U.S. PATENT DOCUMENTS

| 10,643,668 | B1 * | 5/2020 | Poudyal | G11B 20/1889 |
|---|---|---|---|---|
| 2018/0261281 | A1 * | 9/2018 | Moschiano | G11C 11/5628 |
| 2019/0213079 | A1 * | 7/2019 | Kim | G06F 1/30 |
| 2020/0034081 | A1 * | 1/2020 | Lee | G06F 3/0673 |
| 2020/0301780 | A1 * | 9/2020 | Kim | G06F 11/108 |
| 2020/0348880 | A1 * | 11/2020 | Eliash | G06F 3/0619 |

FOREIGN PATENT DOCUMENTS

KR    10-2018-0126118 A    11/2018

\* cited by examiner

*Primary Examiner* — Chae M Ko

(74) *Attorney, Agent, or Firm* — IP & T Group LLP

(57) ABSTRACT

The present technology relates to an electronic device. The storage device according to the present technology may include a memory device and a memory controller. The memory device may include a plurality of memory blocks. The memory controller may control the memory device to perform a recovery operation for a first sudden power off on a target block on which a program operation is stopped due to the first sudden power off among the plurality of memory blocks, and perform a program operation of storing lock data including information indicating completion of the recovery operation for the first sudden power off in a page next to a page on which the recovery operation is completed in the target block.

20 Claims, 11 Drawing Sheets

STORAGE DEVICE AND METHOD OF OPERATING THE SAME

CROSS-REFERENCE TO RELATED APPLICATION

The present application claims priority under 35 U.S.C. § 119(a) to Korean patent application number 10-2020-0144654, filed on Nov. 2, 2020, which is incorporated herein by reference in its entirety.

BACKGROUND

Field of Invention

The present disclosure relates to an electronic device, and more particularly, to a storage device and a method of operating the same.

Description of Related Art

A storage device is a device that stores data under control of a host device such as a computer or a smartphone. A storage device may include a memory device in which data is stored and a memory controller controlling the memory device. The memory device is divided into a volatile memory device and a nonvolatile memory device.

The volatile memory device is a device that stores data only when power is supplied and loses the stored data when the power supply is cut off. The volatile memory device includes a static random access memory (SRAM), a dynamic random access memory (DRAM), and the like.

The nonvolatile memory device is a device that does not lose data even though power is cut off. The nonvolatile memory device includes a read only memory (ROM), a programmable ROM (PROM), an electrically programmable ROM (EPROM), an electrically erasable and programmable ROM (EEPROM), a flash memory, and the like.

SUMMARY

An embodiment of the present disclosure provides a storage device having improved sudden power off recovery performance, and a method of operating the same.

A storage device according to an embodiment of the present disclosure may include a memory device and a memory controller. The memory device may include a plurality of memory blocks. The memory controller may control the memory device to perform a recovery operation for a first sudden power off on a target block on which a program operation is stopped due to the first sudden power off among the plurality of memory blocks, and perform a program operation of storing lock data including information indicating completion of the recovery operation for the first sudden power off in a page next to a page on which the recovery operation is completed in the target block.

A method of operating a storage device including a plurality of memory blocks according to an embodiment of the present disclosure may include sensing a first sudden power off in which power supplied to the storage device is abnormally cut off, performing a recovery operation for the first sudden power off on a target block on which a program operation is stopped due to the first sudden power off among the plurality of memory blocks, and performing a program operation of storing lock data including information indicating completion of the recovery operation for the first sudden power off in a page next to a page on which the recovery operation is completed in the target block.

A memory controller that controls a memory device including a plurality of memory blocks according to an embodiment of the present disclosure may include a power manager and a program operation controller. The power manager may sense a sudden power off in which power supplied to the memory device is abnormally cut off and may generate power abnormality information. The program operation controller may control the memory device to perform a recovery operation for the sudden power off on a target block on which a program operation is stopped due to the sudden power off among the plurality of memory blocks, based on the power abnormality information, and perform a program operation of storing lock data including information indicating completion of the recovery operation for the sudden power off in a page next to a page on which the recovery operation is completed in the target block.

A method of operating a storage device, the operating method comprising: performing, for a sudden power interruption, a recovery operation on a target block within the device; programming, into a lock page as an erased page right next to a copy page, lock data indicating completion of the recovery operation; and skipping, when last programmed data is the lock data within a memory block of the device, a subsequent recovery operation on the memory block for a subsequent sudden power interruption. The program operation is interrupted on a target page within the target block due to the sudden power interruption, and the recovery operation includes an operation of programming dummy data into a dummy page, which is an erased page right next to the target page, and copying data from the target page to the copy page, which is an erased page right next to the dummy page.

According to the present technology, a storage device having improved sudden power off recovery performance, and a method of operating the same are provided.

DETAILED DESCRIPTION

Specific structural or functional descriptions of embodiments disclosed in the present specification or application are illustrated only to describe the embodiments according to the present disclosure. The embodiments according to the present disclosure may be carried out in various forms and the descriptions are not limited to the embodiments described in the present specification or application.

Figure 1:
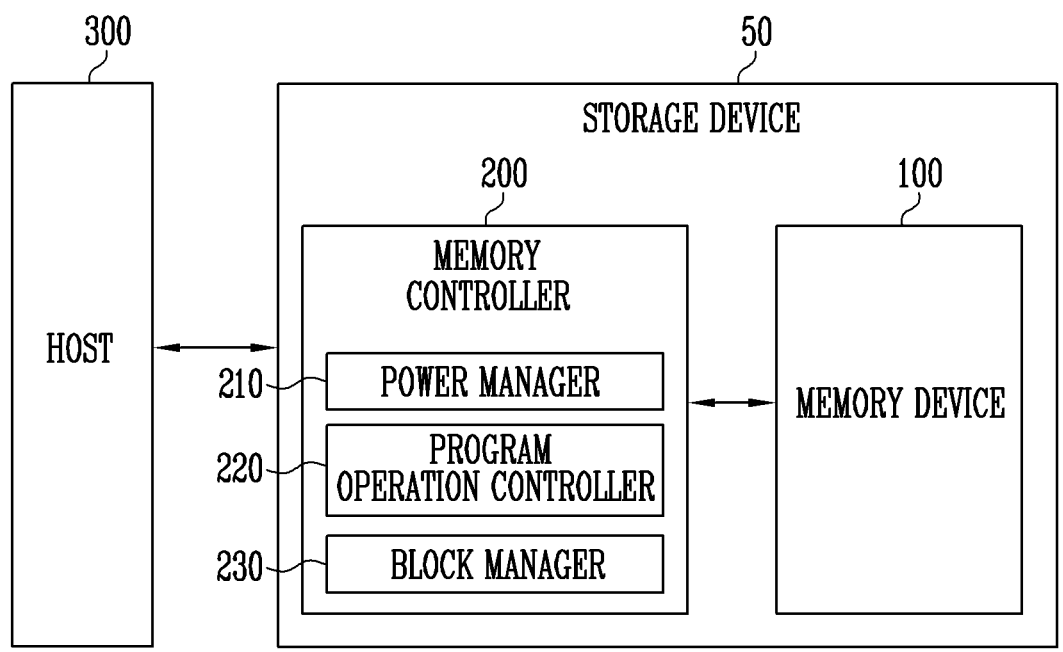
FIG. 1 is a diagram illustrating a storage device according to an embodiment of the present disclosure.

FIG. 1 is a diagram illustrating a storage device according to an embodiment of the present disclosure.

Referring to FIG. 1, the storage device 50 may include a memory device 100 and a memory controller 200 that controls an operation of the memory device. The storage device 50 is a device that stores data under control of a host 300 such as a cellular phone, a smartphone, an MP3 player, a laptop computer, a desktop computer, a game player, a TV, a tablet PC, or an in-vehicle infotainment system.

The storage device 50 may be manufactured as one of various types of storage devices according to a host interface that is a communication method with a host 300. For example, the storage device 50 may be configured as one of various types of storage devices such as an SSD, a multimedia card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and a memory stick.

The storage device 50 may be manufactured as one of various types of packages. For example, the storage device 50 may be manufactured as one of various types of package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data. The memory device 100 operates under control of the memory controller 200. The memory device 100 may include a memory cell array including a plurality of memory cells that store the data.

Each of the memory cells may be configured as a single level cell (SLC) storing one data bit, a multi-level cell (MLC) storing two data bits, a triple level cell (TLC) storing three data bits, or a quad level cell (QLC) storing four data bits.

The memory cell array may include a plurality of memory blocks. Each memory block may include a plurality of memory cells. One memory block may include a plurality of pages. In an embodiment, the page may be a unit for storing data in the memory device 100 or reading data stored in the memory device 100.

The memory block may be a unit for erasing data. In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (eRAM), a phase-change random access memory (PRAM), a magnetoresistive random access memory (MRAM), a ferroelectric random access memory (FRAM), a spin transfer torque random access memory (STT-RAM), or the like. In the present specification, for convenience of description, the memory device 100 is a NAND flash memory.

The memory device 100 is configured to receive a command and an address from the memory controller 200 and access an area selected by the address of the memory cell array. That is, the memory device 100 may perform an operation instructed by the command on the area selected by the address. For example, the memory device 100 may perform a write operation (program operation), a read operation, and an erase operation. During the program operation, the memory device 100 may program data to the area selected by the address. During the read operation, the memory device 100 may read data from the area selected by the address. During the erase operation, the memory device 100 may erase data stored in the area selected by the address.

The memory controller 200 controls an overall operation of the storage device 50.

When power is applied to the storage device 50, the memory controller 200 may execute firmware FW. When the memory device 100 is a flash memory device, the memory controller 200 may operate firmware such as a flash translation layer (FTL) for controlling communication between the host 300 and the memory device 100.

In an embodiment, the memory controller 200 may receive data and a logical block address (LBA) from the host 300 and convert the LBA into a physical block address (PBA) indicating an address of memory included in the memory device 100 cells in which data is to be stored.

The memory controller 200 may control the memory device 100 to perform the program operation, the read operation, or the erase operation in response to a request from the host 300. During the program operation, the memory controller 200 may provide a write command, the PBA, and the data to the memory device 100. During the read operation, the memory controller 200 may provide a read command and the PBA to the memory device 100. During the erase operation, the memory controller 200 may provide an erase command and the PBA to the memory device 100.

In an embodiment, the memory controller 200 may generate and transmit the command, the address, and the data to the memory device 100 regardless of the request from the host 300. For example, the memory controller 200 may provide the command, the address, and the data to the memory device 100 to perform background operations such as a program operation for wear leveling and a program operation for garbage collection.

In an embodiment, the memory controller 200 may control at least two memory devices 100. In this case, the memory controller 200 may control at least two memory devices 100 according to an interleaving method to improve operation performance. The interleaving method may be an operation method for overlapping operation periods of at least two memory devices 100.

In an embodiment, the memory device 100 may include a plurality of memory blocks. The memory controller 200 may control the memory device 100 to perform a recovery operation for a sudden power off on a target block on which a program operation is stopped due to a sudden power off among the plurality of memory blocks. The recovery operation of the sudden power off may include a dummy program operation of storing dummy data in a page next to a page on which the program operation is stopped among the plurality of pages included in the target block. The recovery operation may include a program operation of copying valid data stored in the page on which the program operation is stopped to another page.

The memory controller 200 may control the memory device 100 to perform a program operation of storing lock data in the target block after the recovery operation is performed. The sudden power off may mean a case in which power supplied to the storage device 50 is abnormally cut off due to an unexpected power error during an operation of the storage device 50.

In an embodiment, the lock data may include information indicating completion of the recovery operation for the sudden power off. The lock data may include information on an accumulated number of sudden power off occurring during a program operation for the target block after the target block is opened. The accumulated number may be counted for each block whenever each block becomes open.

In an embodiment, the memory block may be divided into a free block, an open block, or a closed block. The free block may be a block that does not store valid data and may be used to store data after being erased. The open block may be a block in which a program operation on a memory block is not completed. New data may be stored in the open block. The close block may be a block in which all program operations on the memory block are completed and no more new data may be stored.

In an embodiment, the memory controller 200 may control the memory device 100 to read data stored in the last programmed page among a plurality of pages included in the target block when an additional sudden power off occurs after the sudden power off. The memory controller 200 may determine whether to perform the recovery operation for the additional sudden power off, according to whether the read data from the target block is the lock data. For example, when the read data from the target block is the same as the lock data, the memory controller 200 may control the memory device 100 to skip the recovery operation on the target block for the additional sudden power off. When the read data from the target block is different from the lock data, the memory controller 200 may control the memory device 100 to perform the recovery operation on the target block for the additional sudden power off.

In an embodiment, the memory controller 200 may control the memory device 100 to read the lock data stored in the target block. The memory controller 200 may compare the accumulated number of sudden power off occurring during the program operation on the target block after the target block is opened and a reference number based on the lock data.

The memory controller 200 may control the memory device 100 to perform a backup operation of copying data stored in the target block to a memory block different from the target block when the accumulated number of sudden power off is greater than the reference number. The memory controller 200 may set the target block as a bad block after the backup operation is completed.

In an embodiment, the memory controller 200 may include a power manager 210, a program operation controller 220, and a block manager 230.

The power manager 210 may sense the sudden power off in which the power supplied to the storage device 50 is abnormally cut off. The power manager 210 may generate power abnormality information when the sudden power off is sensed.

The program operation controller 220 may receive the power abnormality information. The program operation controller 220 may determine whether the sudden power off occurs based on the power abnormality information received from the power manager 210. The program operation controller 220 may control the memory device 100 to perform a recovery operation for the sudden power off and a program operation of storing the lock data in the target block on which the program operation is stopped due to the sudden power off.

The program operation controller 220 may count the accumulated number of sudden power off for each block whenever each block becomes open. The program operation controller 220 may compare the accumulated number of sudden power off for the target block with the reference number based on the lock data. The program operation controller 220 may control the memory device 100 to perform the backup operation of copying the data stored in the target block to another memory block when the accumulated number of sudden power off exceeds the reference number.

The block manager 230 may store information on whether each of the plurality of memory blocks is a normal block or the bad block. Based on a comparison result of the accumulated number of sudden power off for the target block and the reference number, the block manager 230 may set the target block as the bad block when the number of sudden power off exceeds the reference number.

The host 300 may communicate with the storage device 50 using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCI-E), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

Figure 2:
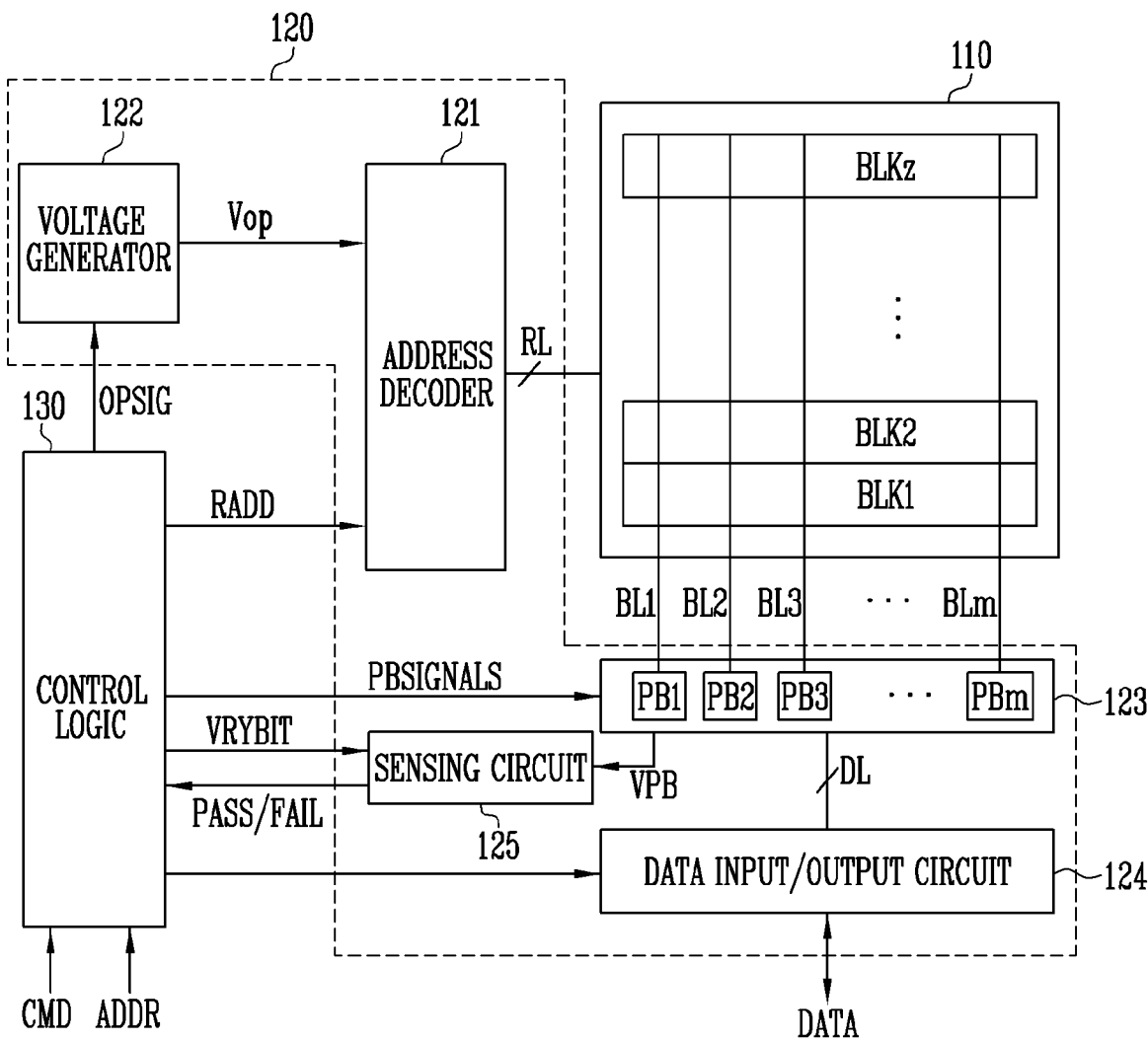
FIG. 2 is a diagram illustrating a structure of a memory device of FIG. 1.

FIG. 2 is a diagram illustrating a structure of the memory device of FIG. 1.

Referring to FIG. 2, the memory device 100 may include a memory cell array 110, a peripheral circuit 120, and a control logic 130.

The memory cell array 110 includes a plurality of memory blocks BLK1 to BLKz. The plurality of memory blocks BLK1 to BLKz are connected to an address decoder 121 through row lines RL. The plurality of memory blocks BLK1 to BLKz are connected to a read and write circuit 123 through bit lines BL1 to BLm. Each of the plurality of memory blocks BLK1 to BLKz includes a plurality of memory cells. In an embodiment, the plurality of memory cells are nonvolatile memory cells. Memory cells connected to the same word line among the plurality of memory cells are defined as one physical page. That is, the memory cell array 110 is configured of a plurality of physical pages. According to an embodiment of the present disclosure, each of the plurality of memory blocks BLK1 to BLKz included in the memory cell array 110 may include a plurality of dummy cells. At least one of the dummy cells may be connected in series between a drain select transistor and the memory cells, and between a source select transistor and the memory cells.

Each of the memory cells of the memory device 100 may be configured as an SLC that stores one data bit, an MLC that stores two data bits, a TLC that stores three data bits, or a QLC that stores four data bits.

The peripheral circuit 120 may include the address decoder 121, a voltage generator 122, the read and write circuit 123, a data input/output circuit 124, and a sensing circuit 125.

The peripheral circuit 120 drives the memory cell array 110. For example, the peripheral circuit 120 may drive the memory cell array 110 to perform a program operation, a read operation, and an erase operation.

The address decoder 121 is connected to the memory cell array 110 through the row lines RL. The row lines RL may include drain select lines, word lines, source select lines, and a common source line. According to an embodiment of the present disclosure, the word lines may include normal word lines and dummy word lines. According to an embodiment of the present disclosure, the row lines RL may further include a pipe select line.

The address decoder 121 is configured to operate in response to control of the control logic 130. The address decoder 121 receives an address ADDR from the control logic 130.

The address decoder 121 is configured to decode a block address of the received address ADDR. The address decoder 121 selects at least one memory block among the memory blocks BLK1 to BLKz according to the decoded block address. The address decoder 121 is configured to decode a row address RADD of the received address ADDR. The address decoder 121 may select at least one word line among word lines of the selected memory block according to the decoded row address RADD. The address decoder 121 may apply an operation voltage Vop supplied from the voltage generator 122 to the selected word line.

During the program operation, the address decoder 121 may apply a program voltage to a selected word line and apply a pass voltage having a level less than that of the program voltage to unselected word lines. During a program verify operation, the address decoder 121 may apply a verify voltage to the selected word line and apply a verify pass voltage having a level greater than that of the verify voltage to the unselected word lines.

During the read operation, the address decoder 121 may apply a read voltage to the selected word line and apply a read pass voltage having a level greater than that of the read voltage to the unselected word lines.

According to an embodiment of the present disclosure, the erase operation of the memory device 100 is performed in memory block units. The address ADDR input to the memory device 100 during the erase operation includes a block address. The address decoder 121 may decode the block address and select at least one memory block according to the decoded block address. During the erase operation, the address decoder 121 may apply a ground voltage to the word lines connected to the selected memory block.

According to an embodiment of the present disclosure, the address decoder 121 may be configured to decode a column address of the transferred address ADDR. The decoded column address may be transferred to the read and write circuit 123. As an example, the address decoder 121 may include a component such as a row decoder, a column decoder, and an address buffer.

The voltage generator 122 is configured to generate a plurality of operation voltages Vop by using an external power voltage supplied to the memory device 100. The voltage generator 122 operates in response to the control of the control logic 130.

In an embodiment, the voltage generator 122 may generate an internal power voltage by regulating the external power voltage. The internal power voltage generated by the voltage generator 122 is used as an operation voltage of the memory device 100.

In an embodiment, the voltage generator 122 may generate the plurality of operation voltages Vop using the external power voltage or the internal power voltage. The voltage generator 122 may be configured to generate various voltages required by the memory device 100. For example, the voltage generator 122 may generate a plurality of erase voltages, a plurality of program voltages, a plurality of pass voltages, a plurality of selection read voltages, and a plurality of non-selection read voltages.

In order to generate the plurality of operation voltages Vop having various voltage levels, the voltage generator 122 may include a plurality of pumping capacitors that receive the internal voltage and selectively activate the plurality of pumping capacitors in response to the control logic 130 to generate the plurality of operation voltages Vop.

The plurality of generated operation voltages Vop may be supplied to the memory cell array 110 by the address decoder 121.

The read and write circuit 123 includes first to m-th page buffers PB1 to PBm. The first to m-th page buffers PB1 to PBm are connected to the memory cell array 110 through first to m-th bit lines BL1 to BLm, respectively. The first to m-th page buffers PB1 to PBm operate in response to the control of the control logic 130.

The first to m-th page buffers PB1 to PBm communicate data DATA with the data input/output circuit 124. At a time of program, the first to m-th page buffers PB1 to PBm receive the data DATA to be stored through the data input/output circuit 124 and data lines DL.

During the program operation, when a program voltage is applied to the selected word line, the first to m-th page buffers PB1 to PBm may transfer the data DATA to be stored, that is, the data DATA received through the data input/output circuit 124 to the selected memory cells through the bit lines BL1 to BLm. The memory cells of the selected page are programmed according to the transferred data DATA. A memory cell connected to a bit line to which a program permission voltage (for example, a ground voltage) is applied may have an increased threshold voltage. A threshold voltage of a memory cell connected to a bit line to which a program inhibition voltage (for example, a power voltage) is applied may be maintained. During the program verify operation, the first to m-th page buffers PB1 to PBm read the data DATA stored in the memory cells from the selected memory cells through the bit lines BL1 to BLm.

During the read operation, the read and write circuit 123 may read the data DATA from the memory cells of the selected page through the bit lines BL and store the read data DATA in the first to m-th page buffers PB1 to PBm.

During the erase operation, the read and write circuit 123 may float the bit lines BL. In an embodiment, the read and write circuit 123 may include a column selection circuit.

The data input/output circuit 124 is connected to the first to m-th page buffers PB1 to PBm through the data lines DL. The data input/output circuit 124 operates in response to the control of the control logic 130.

The data input/output circuit 124 may include a plurality of input/output buffers (not shown) that receive input data DATA. During the program operation, the data input/output circuit 124 receives the data DATA to be stored from an external controller (not shown). During the read operation, the data input/output circuit 124 outputs normal data DATA transferred from the first to m-th page buffers PB1 to PBm included in the read and write circuit 123 to the external controller.

During the read operation or the verify operation, the sensing circuit 125 may generate a reference current in response to a signal of a permission bit VRYBIT generated by the control logic 130 and may compare a sensing voltage VPB received from the read and write circuit 123 with a reference voltage generated by the reference current to output a pass signal or a fail signal to the control logic 130.

The control logic 130 may be connected to the address decoder 121, the voltage generator 122, the read and write circuit 123, the data input/output circuit 124, and the sensing circuit 125. The control logic 130 may be configured to control all operations of the memory device 100. The control logic 130 may operate in response to a command CMD transferred from an external device.

The control logic 130 may generate various signals in response to the command CMD and the address ADDR to control the peripheral circuit 120. For example, the control logic 130 may generate an operation signal OPSIG, the row address RADD, a read and write circuit control signal PBSIGNALS, and the permission bit VRYBIT in response to the command CMD and the address ADDR. The control logic 130 may output the operation signal OPSIG to the voltage generator 122, output the address ADDR to the address decoder 121, output the read and write control signal to the read and write circuit 123, and output the permission bit VRYBIT to the sensing circuit 125. In addition, the control logic 130 may determine whether the verify operation has passed or failed in response to the pass or fail signal PASS/FAIL output by the sensing circuit 125.

Figure 3:
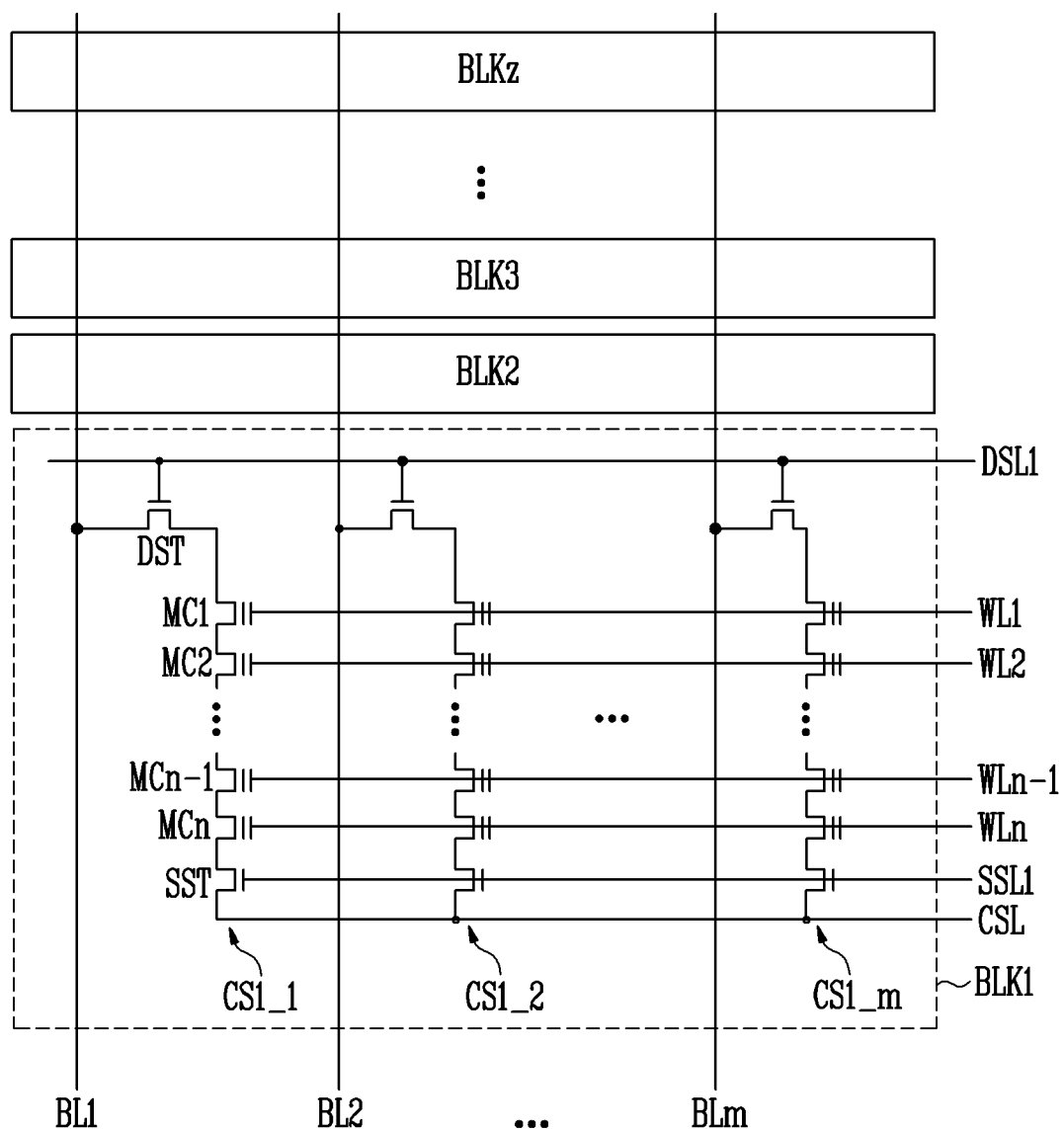
FIG. 3 is a diagram illustrating a memory cell array of FIG. 2.

FIG. 3 is a diagram illustrating the memory cell array of FIG. 2.

Referring to FIG. 3, first to z-th memory blocks BLK1 to BLKz are commonly connected to the first to m-th bit lines BL1 to BLm. In FIG. 3, for convenience of description, elements included in the first memory block BLK1 among the plurality of memory blocks BLK1 to BLKz are shown, and elements included in each of the remaining memory blocks BLK2 to BLKz are omitted. It may be understood that each of the remaining memory blocks BLK2 to BLKz is configured similarly to the first memory block BLK1.

The memory block BLK1 may include a plurality of cell strings CS1_1 to CS1_$m$ ($m$ is a positive integer). The first to m-th cell strings CS1_1 to CS1_$m$ are connected to the first to m-th bit lines BL1 to BLm, respectively. Each of the first to m-th cell strings CS1_1 to CS1_$m$ includes a drain select transistor DST, a plurality of memory cells MC1 to MCn ($n$ is a positive integer) connected in series, and a source select transistor SST.

A gate terminal of the drain select transistor DST included in each of the first to m-th cell strings CS1_1 to CS1_$m$ is connected to a drain select line DSL1. Each of the gate terminals of the first to n-th memory cells MC1 to MCn included in each of the first to m-th cell strings CS1_1 to CS1_$m$ are connected to the first to n-th word lines WL1 to WLn. A gate terminal of the source select transistor SST included in each of the first to m-th cell strings CS1_1 to CS1_$m$ is connected to a source select line SSL1.

For convenience of description, a structure of the cell string is described based on the first cell string CS1_1 among the plurality of cell strings CS1_1 to CS1_$m$. However, it may be understood that each of the remaining cell strings CS1_2 to CS1_$m$ are configured similarly to the first cell string CS1_1.

A drain terminal of the drain select transistor DST included in the first cell string CS1_1 is connected to the first bit line BL1. A source terminal of the drain select transistor DST included in the first cell string CS1_1 is connected to a drain terminal of the first memory cell MC1 included in the first cell string CS1_1. The first to n-th memory cells MC1 to MCn are connected to each other in series. A drain terminal of the source select transistor SST included in the first cell string CS1_1 is connected to a source terminal of the n-th memory cell MCn included in the first cell string CS1_1. A source terminal of the source select transistor SST included in the first cell string CS1_1 is connected to a common source line CSL. In an embodiment, the common source line CSL may be commonly connected to the first to z-th memory blocks BLK1 to BLKz.

The drain select line DSL1, the first to n-th word lines WL1 to WLn, and the source select line SSL1 are included in the row lines RL of FIG. 2. The drain select line DSL1, the first to n-th word lines WL1 to WLn, and the source select line SSL1 are controlled by the address decoder 121. The common source line CSL is controlled by the control logic 130. The first to m-th bit lines BL1 to BLm are controlled by the read and write circuit 123.

Figure 4:
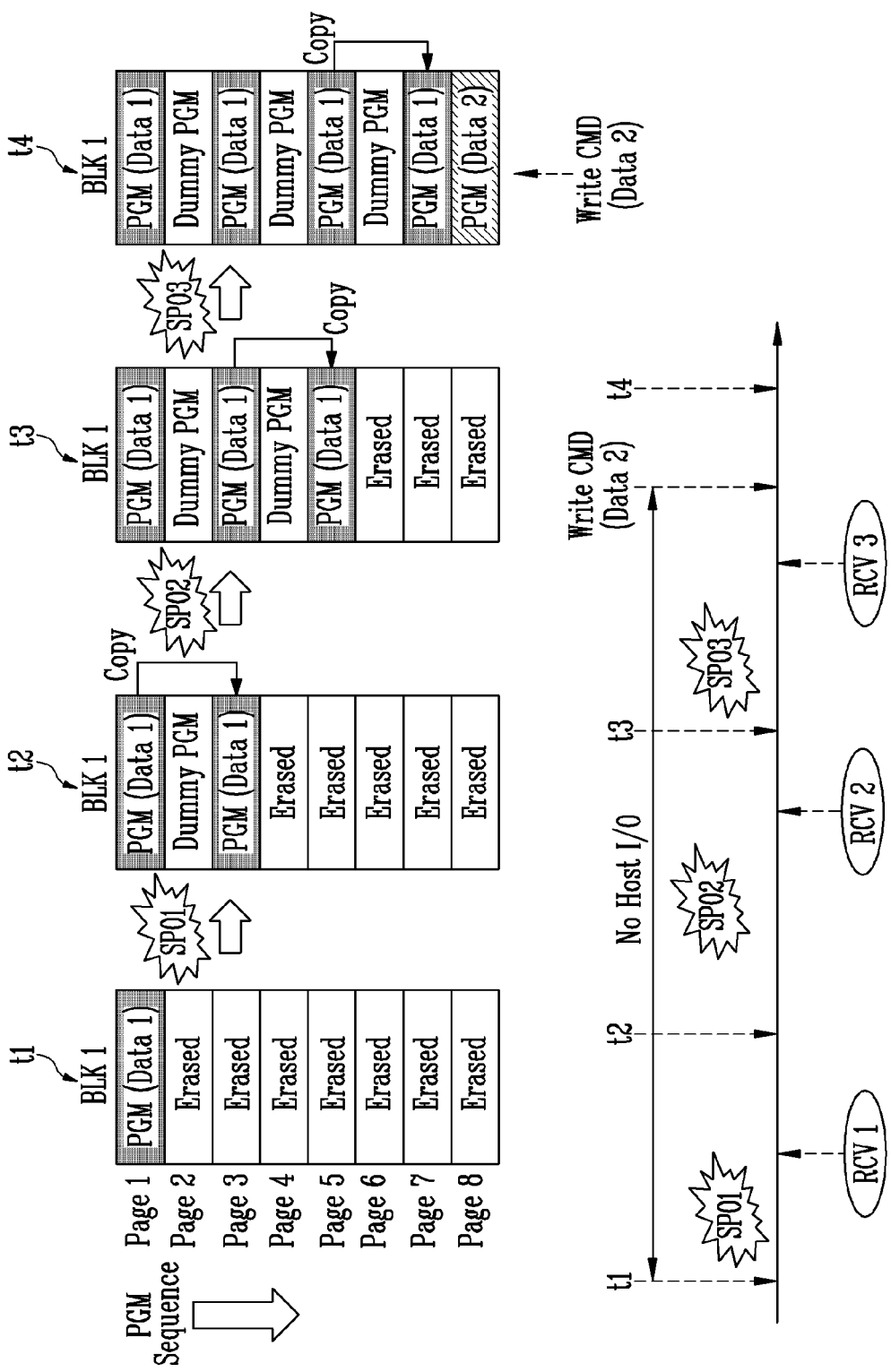
FIG. 4 is a diagram illustrating a sudden power off recovery operation.

FIG. 4 is a diagram illustrating a sudden power off recovery operation.

Referring to FIG. 4, a memory block BLK 1 may include first to eighth pages Page 1 to Page 8. The number of pages included in the memory block BLK 1 is not limited to the present embodiment. In FIG. 4, a program sequence may proceed from the first page Page 1 to the eighth page Page 8. In another embodiment, the program sequence may be performed in a reverse order.

At t1, data Data 1 may be programmed in the first page Page 1. The second to eighth pages Page 2 to Page 8 may be erase pages.

A first sudden power off SPO1 may occur between t1 and t2, and a first recovery operation RCV 1 may be performed after the first sudden power off SPO1. The first recovery operation RCV 1 may include an operation of programming dummy data in the second page Page 2 which is a first erase page on the program sequence in the memory block BLK 1. The first recovery operation RCV 1 may include a program operation of copying the data Data 1 stored in the first page Page 1, which is the last programmed page before the first sudden power off SPO1, to the third page Page 3, which is a second erase page on the program sequence.

At t2, the data Data 1 may be programmed in the first page Page 1. The dummy data may be programmed in the second page Page 2. The data Data 1 may be programmed in the third page Page 3. The fourth to eighth pages Page 4 to Page 8 may be erase pages.

A second sudden power off SPO2 may occur between t2 and t3, and a second recovery operation RCV 2 may be performed after the second sudden power off SPO2. The second recovery operation RCV 2 may include an operation of programming the dummy data in the fourth page Page 4 which is a first erase page on the program sequence in the memory block BLK 1. The second recovery operation RCV 2 may include a program operation of copying the data Data 1 stored in the third page Page 3, which is the last programmed page before the second sudden power off SPO2, to the fifth page Page 5, which is a second erase page on the program sequence.

At t3, the data Data 1 may be programmed in the first page Page 1. The dummy data may be programmed in the second page Page 2. The data Data 1 may be programmed in the third page Page 3. The dummy data may be programmed in the fourth page Page 4. The data Data 1 may be programmed in the fifth page Page 5. The sixth to eighth pages Page 6 to Page 8 may be erase pages.

A third sudden power off SPO3 may occur between t3 and t4, and a third recovery operation RCV 3 may be performed after the third sudden power off SPO3. The third recovery operation RCV 3 may include an operation of programming the dummy data in the sixth page Page 6 which is a first erase page on the program sequence in the memory block BLK 1. The third recovery operation RCV 3 may include a program operation of copying the data Data 1 stored in the fifth page Page 5, which is the last programmed page before the third sudden power off SPO3, to the seventh page Page 7, which is a second erase page on the program sequence.

After the third recovery operation RCV 3 is performed, new data Data 2 may be programmed in the memory block BLK 1 according to a write command received from a host.

At t4, the data 1 may be programmed in the first page Page 1. The dummy data may be programmed in the second page Page 2. The data Data 1 may be programmed in the third page Page 3. The dummy data may be programmed in the fourth page Page 4. The data Data 1 may be programmed in the fifth page Page 5. The dummy data may be programmed in the sixth page Page 6. The data Data 1 may be programmed in the seventh page Page 7. The data Data 2 may be programmed in the eighth page Page 8.

According to the process of FIG. 4, even though an input/output (Host I/O) of a host is not present from t1 until the write command is received from the host, the recovery operation may be repeatedly performed while a power cycle in which power is cut off due to the sudden power off and power is supplied again is repeated. Therefore, a storage space of the memory block BLK 1 may be wasted as the data Data 1 is repeatedly stored in the memory block BLK 1 due to an unnecessary recovery operation. In addition, deterioration of the memory block BLK 1 may be severe due to the repeated recovery operation.

Figure 5:
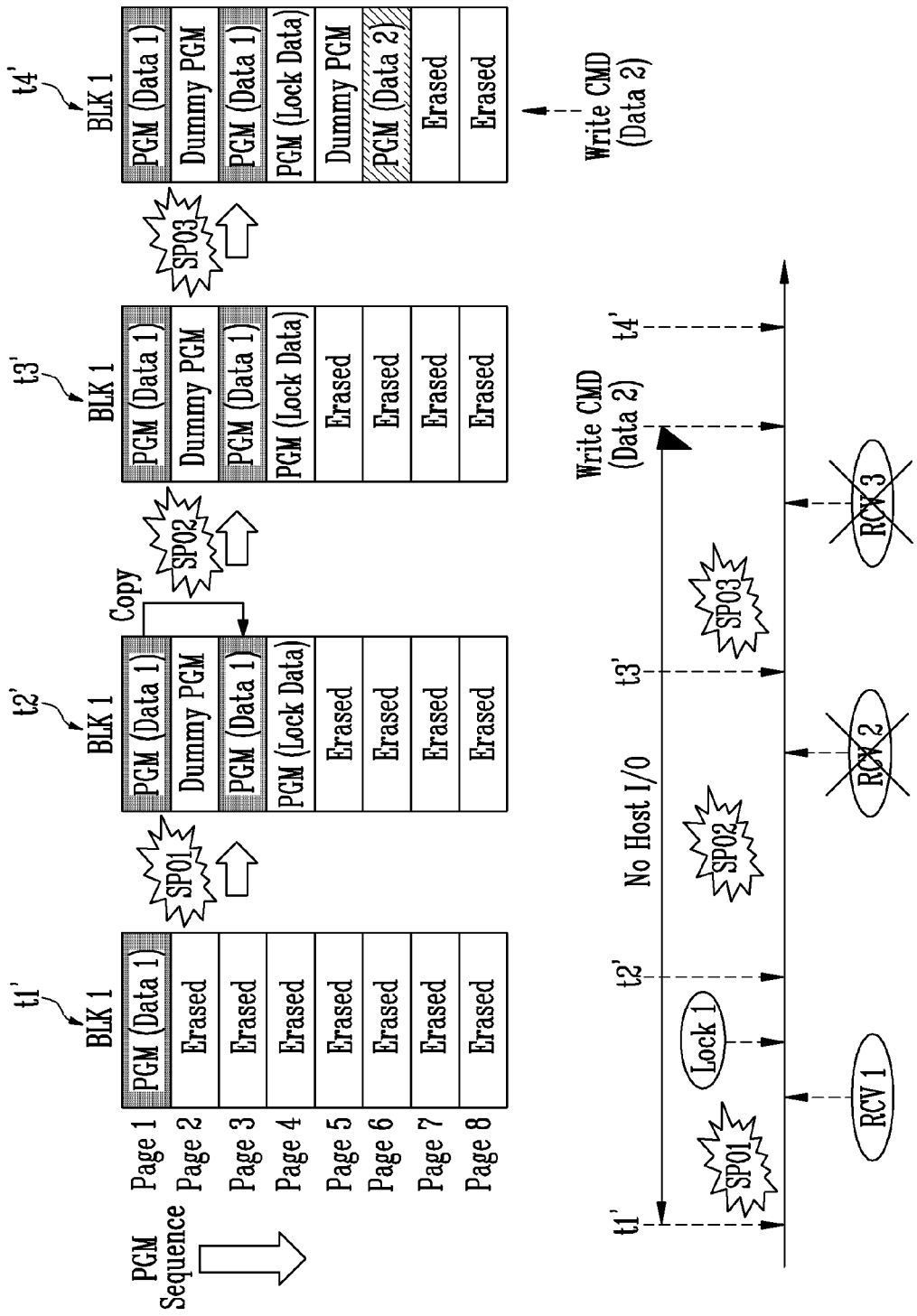
FIG. 5 is a diagram illustrating a sudden power off recovery operation according to an embodiment of the present disclosure.

FIG. 5 is a diagram illustrating a sudden power off recovery operation according to an embodiment of the present disclosure.

Referring to FIG. 5, a memory block BLK 1 may include first to eighth pages Page 1 to Page 8. The number of pages included in the memory block BLK 1 is not limited to the present embodiment. In FIG. 5, a program sequence may proceed from the first page Page 1 to the eighth page Page 8. In another embodiment, the program sequence may be performed in a reverse order.

At t1', data Data 1 may be programmed in the first page Page 1. The second to eighth pages Page 2 to Page 8 may be erase pages.

A first sudden power off SPO1 may occur between t1' and t2', and a first recovery operation RCV 1 may be performed after the first sudden power off SPO1. The first recovery operation RCV 1 may include an operation of programming dummy data in the second page Page 2 which is a first erase page on the program sequence in the memory block BLK 1. The first recovery operation RCV 1 may include a program operation of copying the data Data 1 stored in the first page Page 1, which is the last programmed page before the first sudden power off SPO1, to the third page Page 3, which is a second erase page on the program sequence.

After the first recovery operation RCV 1 is performed, a program operation Lock 1 of storing the lock data in the fourth page Page 4, which is a third erase page on the program sequence, may be performed. The lock data may include information indicating completion of the first recovery operation RCV 1 for the first sudden power off SPO1. The lock data may include information on the accumulated number of sudden power off occurring while the program operation is performed on the memory block after the memory block BLK 1 is opened. In FIG. 5, since only the first sudden power off SPO1 occurs on the memory block BLK 1 at a time point at which the lock data is programmed, the accumulated number of sudden power off may be 1.

At t2', the data Data 1 may be programmed in the first page Page 1. The dummy data may be programmed in the second page Page 2. The data Data 1 may be programmed in the third page Page 3. The lock data may be programmed in the fourth page Page 4. The fifth to eighth pages Page 5 to Page 8 may be erase pages.

A second sudden power off SPO2 may occur between t2' and t3'. The data stored in the page last programmed in the memory block BLK 1 may be read after the second sudden power off SPO2. A second recovery operation RCV 2 may be selectively performed according to whether the read data is the lock data. For example, when the read data is the lock data, the second recovery operation RCV 2 may be skipped. When the read data is data different from the lock data, the second recovery operation RCV 2 may be performed.

Since the data read from the fourth page Page 4, which is the page last programmed in the memory block BLK 1 after the second sudden power off SPO2 is the same as the lock data, the second recovery operation RCV 2 may be skipped.

At t3', the data Data 1 may be programmed in the first page Page 1. The dummy data may be programmed in the second page Page 2. The data Data 1 may be programmed in the third page Page 3. The lock data may be programmed in the fourth page Page 4. The fifth to eighth pages Page 5 to Page 8 may be erase pages.

A third sudden power off SPO3 may occur between t3' and t4'. Since the data read from the fourth page Page 4, which is the page last programmed in the memory block BLK 1 after the third sudden power off SPO3 is the same as the lock data, a third recovery operation RCV 3 may be skipped.

After the third sudden power off SPO3, data Data 2, which is new data, may be programmed in the memory block BLK according to a write command received from the host. Specifically, after the dummy data is programmed in the fifth page Page 5, which is a next page of the fourth page Page 4, which is the last programmed page, the data Data 2 may be programmed in the sixth page Page 6. In another embodiment, the data Data 2 may be programmed directly in the fifth page Page 5, which is a next page of the fourth page Page 4, which is the last programmed page, without a dummy program operation.

At t4', the Data data 1 may be programmed in the first page Page 1. The dummy data may be programmed in the second page Page 2. The data Data 1 may be programmed in the third page Page 3. The lock data may be programmed in the fourth page Page 4. The dummy data may be programmed in the fifth page Page 5. The data Data 2 may be programmed in the sixth page Page 6. The seventh and eighth pages Page 7 and Page 8 may be erase pages.

In the embodiment of FIG. 5, when an input/output (Host I/O) of a host is not present from t1' until the write command is received from the host, an unnecessary recovery operation may be skipped even though a power cycle in which power is cut off due to the sudden power off and power is supplied again is repeated. Therefore, waste of a storage space of the memory block BLK 1 caused by repeated storage of the data Data 1 in the memory block BLK 1 due to an unnecessary recovery operation may be prevented. In addition, deterioration of the memory block BLK 1 may be prevented by skipping an unnecessary recovery operation.

Figure 6:
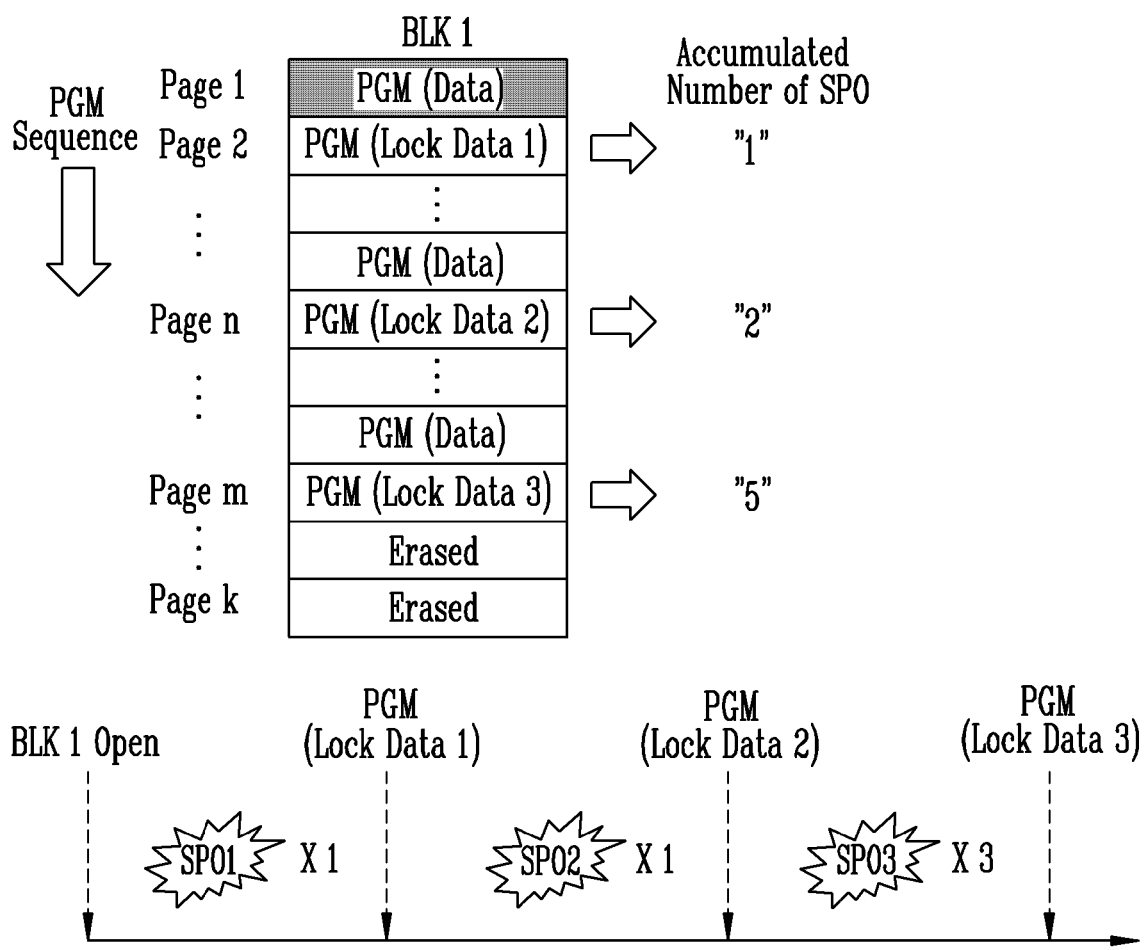
FIG. 6 is a diagram illustrating an accumulated number of sudden power off of lock data according to an embodiment of the present disclosure.

FIG. 6 is a diagram illustrating an accumulated number of sudden power off of lock data according to an embodiment of the present disclosure.

Referring to FIG. 6, the memory block BLK 1 may include first to k-th (k is a natural number equal to or greater than 4) pages. The number of pages included in the memory block BLK 1 is not limited to the present embodiment.

First lock data Lock Data 1 may be programmed in the second page Page 2.

The number of sudden power off occurring during the program operation on the memory block BLK 1 before the first lock data Lock Data 1 is programmed may be 1. Therefore, the accumulated number of sudden power off may be 1.

Second lock data Lock Data 2 may be programmed in the n-th (n is a natural number greater than 1 and less than m) page n.

The number of sudden power off occurring during the program operation on the memory block BLK 1 from after the first lock data Lock Data 1 is programmed to before the second lock data Lock Data 2 is programmed may be 1. Therefore, the accumulated number of sudden power off at a time point at which the second lock data Lock Data 2 is programmed may be 2.

Referring to FIG. 5, while the input/output (Host I/O) of the host is not present, the lock data may not be programmed even though the sudden power off occurs. The lock data may be newly programmed in a case in which the sudden power off occurs while the input/output (Host I/O) of the host is present. Therefore, the lock data may be programmed after a plurality of sudden power offs occur in some cases.

Third lock data Lock Data 3 may be programmed in an m-th (m is a natural number greater than n and less than k) page m.

The number of sudden power off occurring during the program operation on the memory block BLK 1 from after the second lock data Lock Data 2 is programmed to before the third lock data Lock Data 3 is programmed may be 3. Therefore, the accumulated number of sudden power off at a time point at which the third lock data Lock Data 3 is programmed may be 5.

Figure 7:
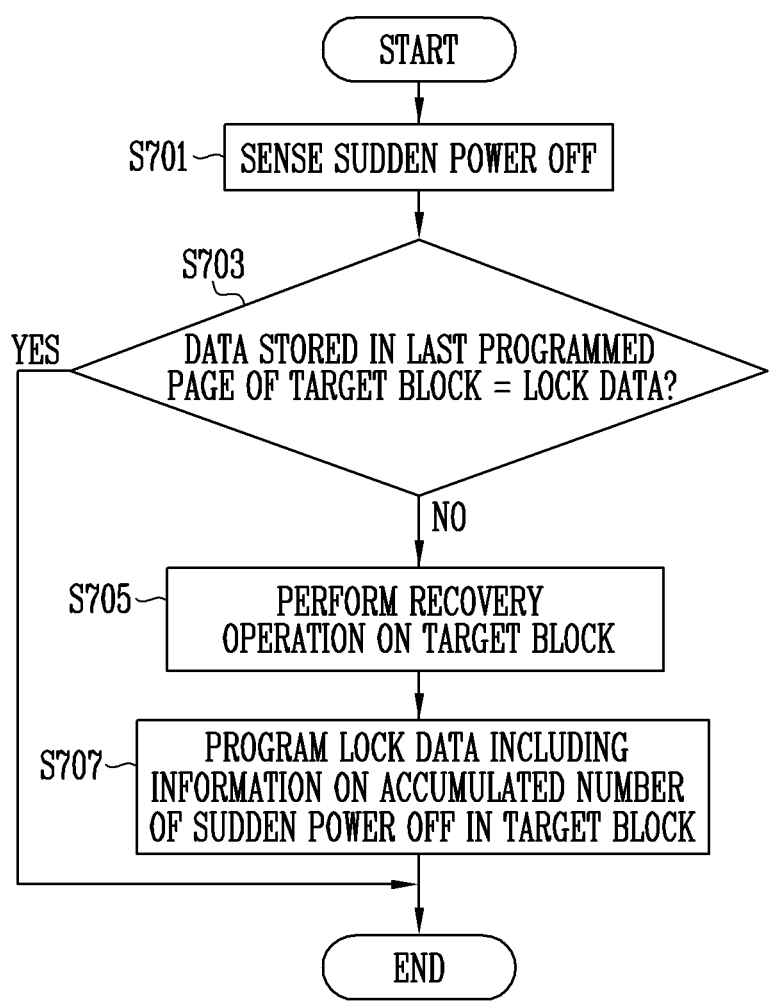
FIG. 7 is a flowchart illustrating an operation of a storage device according to an embodiment of the present disclosure.

FIG. 7 is a flowchart illustrating an operation of a storage device according to an embodiment of the present disclosure.

Referring to FIG. 7, in operation S701, the storage device may sense the sudden power off.

In operation S703, the storage device may determine whether the data stored in the last programmed page of the target block is the lock data. As a result of the determination, when the data stored in the last programmed page is the lock data, the operation may be ended, and when the data stored in the last programmed page is not the lock data, the operation may proceed to operation S705.

In operation S705, the storage device may perform the recovery operation described above with reference to FIG. 5 on the target block.

In operation S707, the storage device may program the lock data including the information on the accumulated number of sudden power off described with reference to FIG. 5 in the target block.

Figure 8:
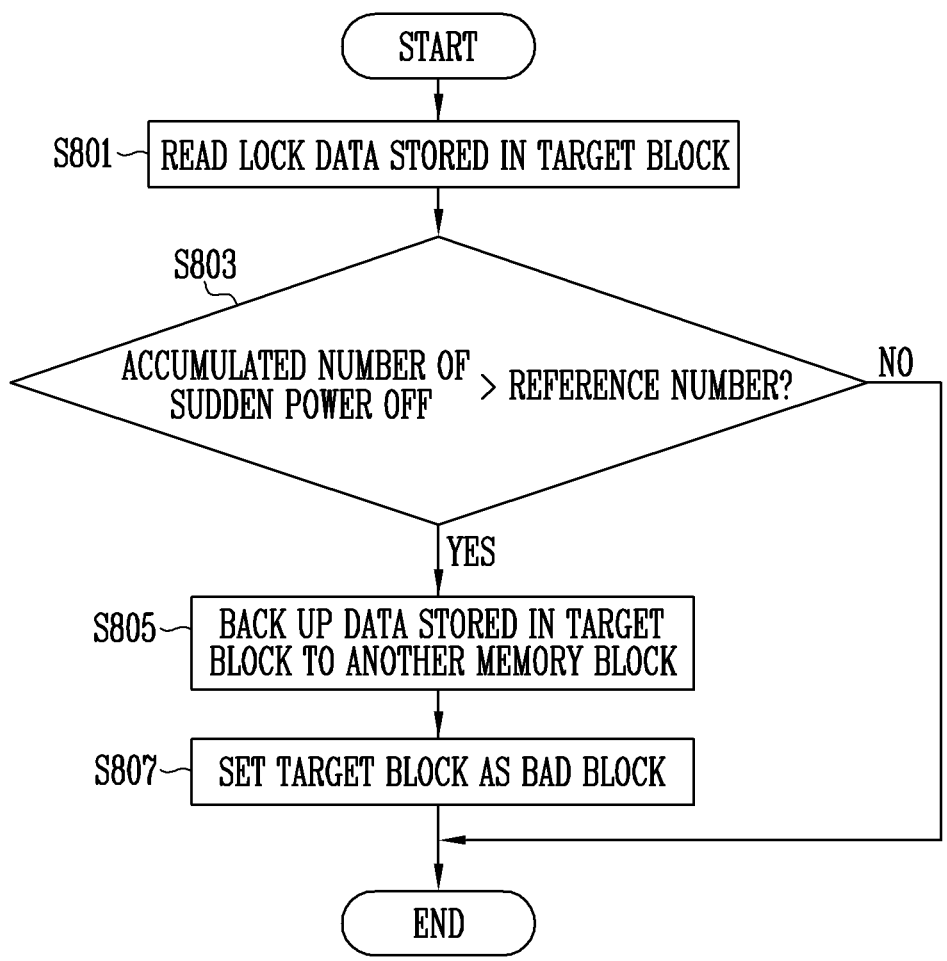
FIG. 8 is a flowchart illustrating an operation of a storage device according to an embodiment of the present disclosure.

FIG. 8 is a flowchart illustrating an operation of a storage device according to an embodiment of the present disclosure.

Referring to FIG. 8, in operation S801, the storage device may read the lock data stored in the target block.

In operation S803, the storage device may determine whether the accumulated number of sudden power off for the target block exceeds the reference number based on the lock data. As a result of the determination, when the accumulated number of sudden power off is equal to or less than the reference number, the operation is ended, and when the accumulated number of sudden power off exceeds the reference number, the operation may proceed to operation S805.

In operation S805, the storage device may back up the data stored in the target block to another memory block.

In operation S807, the storage device may set the target block as the bad block.

Figure 9:
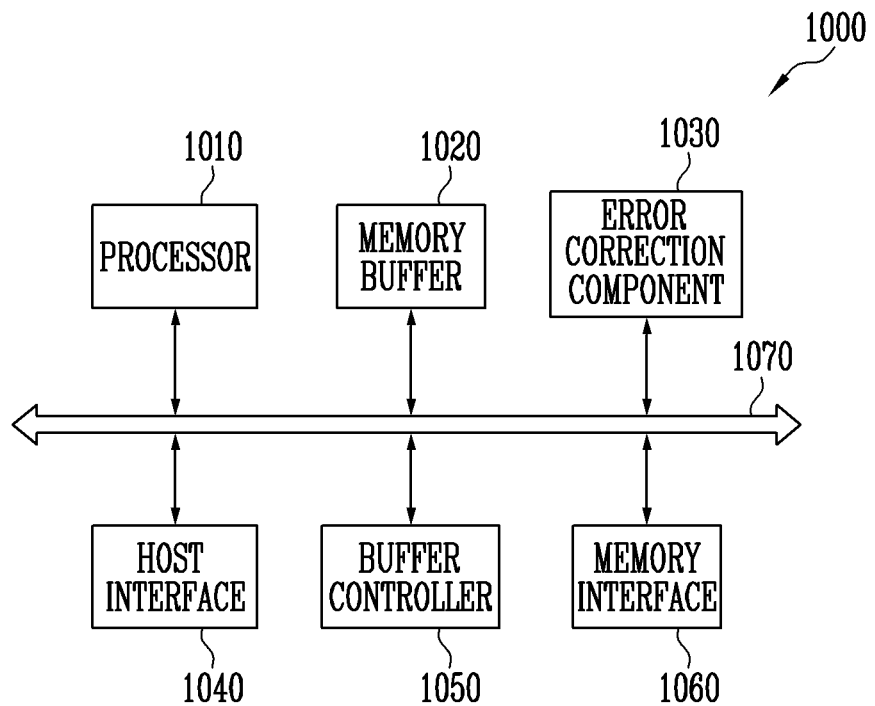
FIG. 9 is a diagram illustrating another embodiment of a memory controller of FIG. 1.

FIG. 9 is a diagram illustrating another embodiment of the memory controller of FIG. 1.

Referring to FIG. 9, the memory controller 1000 is connected to a host and the memory device. The memory controller 1000 is configured to access the memory device in response to a request from the host. For example, the memory controller 1000 is configured to control the write, read, erase, and background operations of the memory device. The memory controller 1000 is configured to provide an interface between the memory device and the host. The memory controller 1000 is configured to drive firmware for controlling the memory device.

The memory controller 1000 may include a processor 1010, a memory buffer 1020, an error correction component (ECC) 1030, a host interface 1040, a buffer control circuit 1050, a memory interface 1060, and a bus 1070.

The bus 1070 may be configured to provide a channel between components of the memory controller 1000.

The processor 1010 may control an overall operation of the memory controller 1000 and may perform a logical operation. The processor 1010 may communicate with an external host through the host interface 1040 and communicate with the memory device through the memory interface 1060. In addition, the processor 1010 may communicate with the memory buffer 1020 through the buffer controller 1050. The processor 1010 may control an operation of the storage device using the memory buffer 1020 as an operation memory, a cache memory, or a buffer memory.

The processor 1010 may perform a function of a flash translation layer (FTL). The processor 1010 may convert an LBA provided by the host into a PBA through the FTL. The FTL may receive the LBA and convert the LBA into the PBA using a mapping table. There are several address mapping methods of the FTL according to a mapping unit. A representative address mapping method includes a page mapping method, a block mapping method, and a hybrid mapping method.

The processor 1010 is configured to randomize data received from the host. For example, the processor 1010 may randomize the data received from the host using a randomizing seed. The randomized data is provided to the memory device as data to be stored and is programmed to the memory cell array.

The processor 1010 is configured to de-randomize data received from the memory device during the read operation. For example, the processor 1010 may de-randomize the data received from the memory device using a de-randomizing seed. The de-randomized data may be output to the host.

In an embodiment, the processor 1010 may perform the randomization and the de-randomization by driving software or firmware.

The memory buffer 1020 may be used as an operation memory, a cache memory, or a buffer memory of the processor 1010. The memory buffer 1020 may store codes and commands executed by the processor 1010. The memory buffer 1020 may store data processed by the processor 1010. The memory buffer 1020 may include a static RAM (SRAM) or a dynamic RAM (DRAM).

The ECC 1030 may perform error correction. The ECC 1030 may perform error correction encoding (ECC encoding) based on data to be written to the memory device through memory interface 1060. The error correction encoded data may be transferred to the memory device through the memory interface 1060. The ECC 1030 may perform error correction decoding (ECC decoding) on the data received from the memory device through the memory interface 1060. For example, the ECC 1030 may be included in the memory interface 1060 as a component of the memory interface 1060.

The host interface 1040 is configured to communicate with an external host under control of the processor 1010. The host interface 1040 may be configured to perform communication using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCI-E), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

The buffer controller 1050 is configured to control the memory buffer 1020 under the control of the processor 1010.

The memory interface 1060 is configured to communicate with the memory device under the control of the processor 1010. The memory interface 1060 may communicate a command, an address, and data with the memory device through a channel.

For example, the memory controller 1000 may not include the memory buffer 1020 and the buffer controller 1050.

For example, the processor 1010 may control the operation of the memory controller 1000 using codes. The processor 1010 may load the codes from a nonvolatile memory device (for example, a read only memory) provided inside the memory controller 1000. As another example, the processor 1010 may load the codes from the memory device through the memory interface 1060.

For example, the bus 1070 of the memory controller 1000 may be divided into a control bus and a data bus. The data bus may be configured to transmit data within the memory controller 1000 and the control bus may be configured to transmit control information such as a command and an address within the memory controller 1000. The data bus and the control bus may be separated from each other and may not interfere with each other or affect each other. The data bus may be connected to the host interface 1040, the buffer controller 1050, the ECC 1030, and the memory interface 1060. The control bus may be connected to the host interface 1040, the processor 1010, the buffer controller 1050, the memory buffer 1020, and the memory interface 1060.

In an embodiment, the power manager 210, the program operation controller 220, and the block manager 230 of FIG. 1 may be included in the processor 1010.

Figure 10:
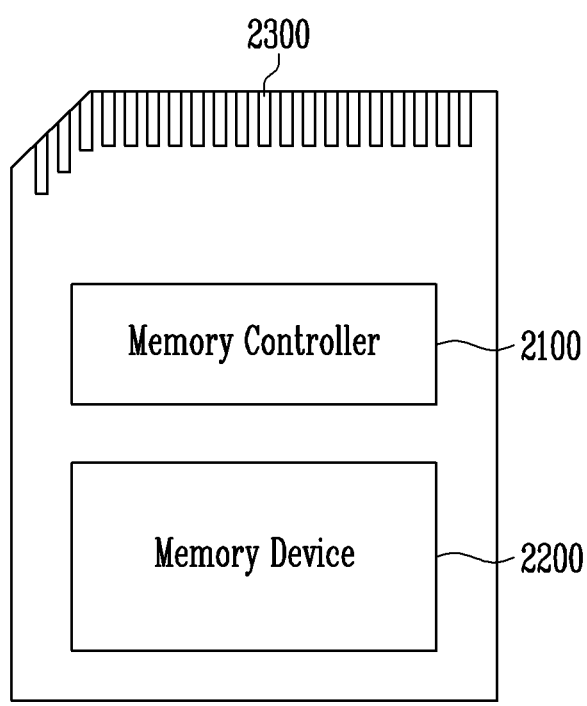
FIG. 10 is a block diagram illustrating a memory card system to which a storage device according to an embodiment of the present disclosure is applied.

FIG. 10 is a block diagram illustrating a memory card system to which a storage device according to an embodiment of the present disclosure is applied.

Referring to FIG. 10, the memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 may be configured to control read, write, erase, and background operations of the memory device 2200. The memory controller 2100 is configured to provide an interface between the memory device 2200 and a host. The memory controller 2100 is configured to drive firmware for controlling the memory device 2200. The memory controller 2100 may be implemented identically to the memory controller 200 described with reference to FIG. 1.

For example, the memory controller 2100 may include components such as a random access memory (RAM), a processor, a host interface, a memory interface, and an ECC.

The memory controller 2100 may communicate with an external device through the connector 2300. The memory controller 2100 may communicate with an external device (for example, the host) according to a specific communication standard. For example, the memory controller 2100 is configured to communicate with an external device through at least one of various communication standards such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. For example, the connector 2300 may be defined by at least one of the various communication standards described above.

For example, the memory device 2200 may be configured of various nonvolatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin transfer torque-magnetic RAM (STT-MRAM).

The memory controller 2100 and the memory device 2200 may be integrated into one semiconductor device to configure a memory card. For example, the memory controller 2100 and the memory device 2200 may be integrated into one semiconductor device to configure a memory card such as a PC card (personal computer memory card international association (PCMCIA)), a compact flash (CF) card, a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 11:
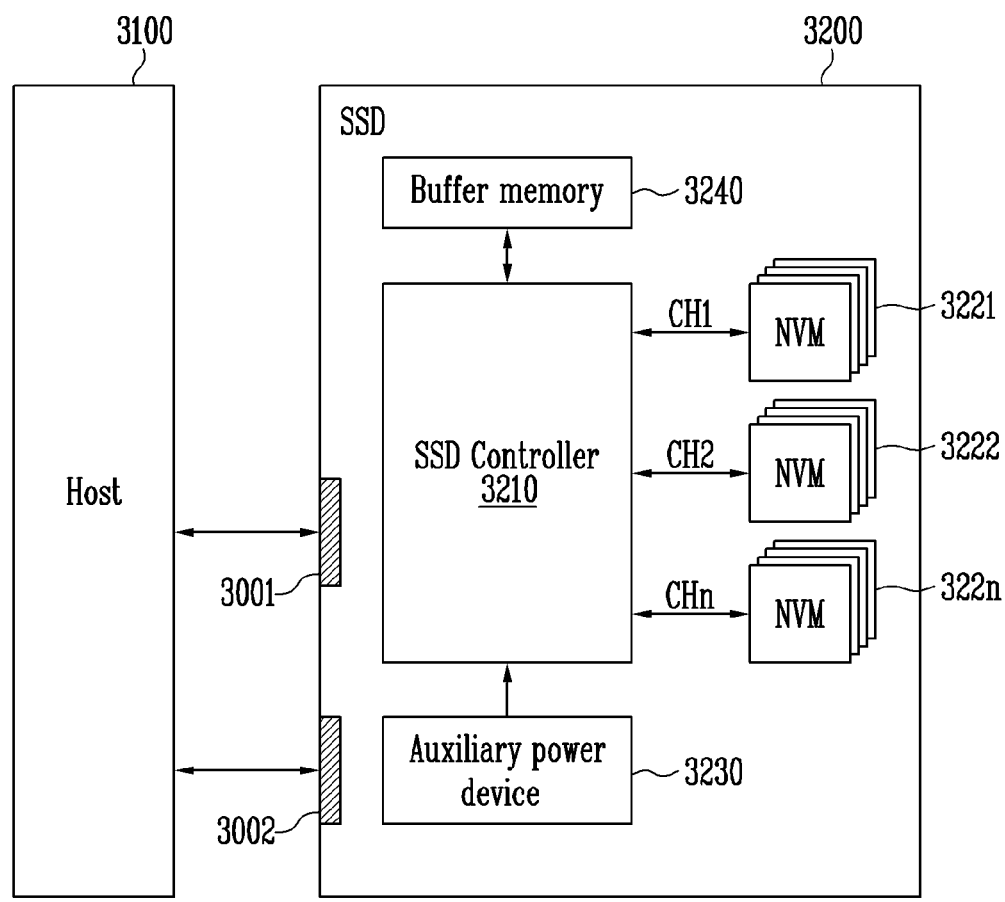
FIG. 11 is a block diagram illustrating a solid state drive (SSD) system to which a storage device according to an embodiment of the present disclosure is applied.

FIG. 11 is a block diagram illustrating a solid state drive (SSD) system to which a storage device according to an embodiment of the present disclosure is applied.

Referring to FIG. 11, the SSD system 3000 includes a host 3100 and an SSD 3200. The SSD 3200 exchanges a signal SIG with the host 3100 through a signal connector 3001 and receives power PWR through a power connector 3002. The SSD 3200 includes an SSD controller 3210, a plurality of nonvolatile memories 3221 to 322n, an auxiliary power device 3230, and a buffer memory 3240.

According to an embodiment of the present disclosure, the SSD controller 3210 may perform the function of the memory controller 200 described with reference to FIG. 1.

The SSD controller 3210 may control the plurality of nonvolatile memories 3221 to 322n in response to the signal SIG received from the host 3100. For example, the signal SIG may be signals based on an interface between the host 3100 and the SSD 3200. For example, the signal SIG may be a signal defined by at least one of interfaces such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The auxiliary power device 3230 is connected to the host 3100 through the power connector 3002. The auxiliary power device 3230 may receive the power PWR from the host 3100 and may charge the power. The auxiliary power device 3230 may provide power of the SSD 3200 when power supply from the host 3100 is not smooth. For example, the auxiliary power device 3230 may be positioned in the SSD 3200 or may be positioned outside the SSD 3200. For example, the auxiliary power device 3230 may be positioned on a main board and may provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or may temporarily store metadata (for example, a mapping table) of the nonvolatile memories 3221 to 322n. The buffer memory 3240 may include a volatile memory such as a DRAM, an SDRAM, a DDR SDRAM, an LPDDR SDRAM, and a GRAM, or a nonvolatile memory such as an FRAM, a ReRAM, an STT-MRAM, and a PRAM.

Figure 12:
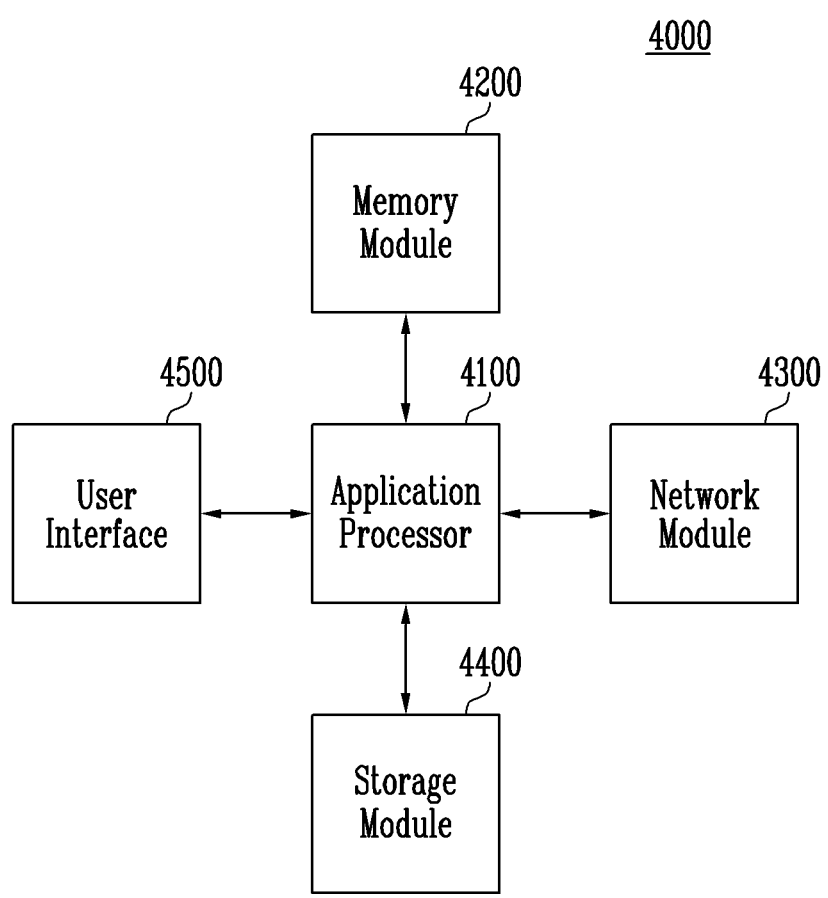
FIG. 12 is a block diagram illustrating a user system to which a storage device according to an embodiment of the present disclosure is applied.

FIG. 12 is a block diagram illustrating a user system to which a storage device according to an embodiment of the present disclosure is applied.

Referring to FIG. 12, the user system 4000 includes an application processor 4100, a memory module 4200, a network module 4300, a storage module 4400, and a user interface 4500.

The application processor 4100 may drive components, an operating system (OS), a user program, or the like included in the user system 4000. For example, the application processor 4100 may include controllers, interfaces, graphics engines, and the like that control the components included in the user system 4000. The application processor 4100 may be provided as a system-on-chip (SOC).

The memory module 4200 may operate as a main memory, an operation memory, a buffer memory, or a cache memory of the user system 4000. The memory module 4200 may include a volatile random access memory such as a DRAM, an SDRAM, a DDR SDRAM, a DDR2 SDRAM, a DDR3 SDRAM, an LPDDR SDARM, an LPDDR2 SDRAM, and an LPDDR3 SDRAM, or a nonvolatile random access memory, such as a PRAM, a ReRAM, an MRAM, and an FRAM. For example, the application processor 4100 and memory module 4200 may be packaged based on a package on package (POP) and provided as one semiconductor package.

The network module 4300 may communicate with external devices. For example, the network module 4300 may support wireless communication such as code division multiple access (CDMA), global system for mobile communications (GSM), wideband CDMA (WCDMA), CDMA-2000, time division multiple access (TDMA), long term evolution, Wimax, WLAN, UWB, Bluetooth, and Wi-Fi. For example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. For example, the storage module 4400 may be implemented as a nonvolatile semiconductor memory element such as a phase-change RAM (PRAM), a magnetic RAM (MRAM), a resistive RAM (ReRAM), a NAND flash, a NOR flash, and a three-dimensional NAND flash. For example, the storage module 4400 may be provided as a removable storage device (removable drive), such as a memory card, and an external drive of the user system 4000.

For example, the storage module 4400 may include a plurality of nonvolatile memory devices, and the plurality of nonvolatile memory devices may operate identically to the memory device 100 described with reference to FIG. 1. The storage module 4400 may operate identically to the storage device 50 described with reference to FIG. 1.

The user interface 4500 may include interfaces for inputting data or an instruction to the application processor 4100 or for outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, a speaker, and a monitor.

Although the foregoing embodiments have been illustrated and described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive. The present invention is intended to embrace all modifications and alternatives that fall within the scope of the appended claims.

What is claimed is:

1. A storage device comprising:
    a memory device including a plurality of memory blocks; and
    a controller configured to control the memory device to:
        perform a recovery operation for a first sudden power off on a target block on which a program operation is stopped due to the first sudden power off among the plurality of memory blocks, and
        perform a program operation of storing lock data including information indicating completion of the recovery operation for the first sudden power off in a page next to a page on which the recovery operation is completed in the target block.

2. The storage device of claim 1, wherein the lock data includes information on an accumulated number of sudden power off occurring during a program operation on the target block after the target block is opened.

3. The storage device of claim 2, wherein the memory controller is further configured to control the memory device to:
copy data stored in the target block to a memory block different from the target block among the plurality of memory blocks, based on a comparison result of the accumulated number of sudden power off and a reference number, and
set the target block as a bad block.

4. The storage device of claim 1, wherein the memory controller controls, in the recovery operation for the first sudden power off, the memory device to:
perform a program operation of storing dummy data in a first erase page consecutive to a page on which the program operation is stopped due to the first sudden power off among a plurality of pages included in the target block, and
perform a program operation of copying data stored in the page on which the program operation is stopped to a second erase page consecutive to the first erase page.

5. The storage device of claim 4, wherein the page on which the recovery operation is completed is the second erase page.

6. The storage device of claim 1, wherein the memory controller is further configured to determine, when a second sudden power off is sensed, whether to perform a recovery operation for the second sudden power off according to whether the lock data is stored in a last programmed page among a plurality of pages in the target block.

7. The storage device of claim 6, wherein the memory controller is further configured to control, when data different from the lock data is stored in the last programmed page, the memory device to perform the recovery operation for the second sudden power off.

8. The storage device of claim 6, wherein the memory controller is further configured to control, when receiving a write request and write data from a host after the second sudden power off, the memory device to perform a program operation of storing dummy data and the write data in the target block.

9. A method of operating a storage device including a plurality of memory blocks, the method comprising:
sensing a first sudden power off in which power supplied to the storage device is abnormally cut off;
performing a recovery operation for the first sudden power off on a target block on which a program operation is stopped due to the first sudden power off among the plurality of memory blocks; and
performing a program operation of storing lock data including information indicating completion of the recovery operation for the first sudden power off in a page next to a page on which the recovery operation is completed in the target block.

10. The method of claim 9, wherein the lock data includes information on an accumulated number of sudden power off occurring during a program operation on the target block after the target block is opened.

11. The method of claim 10, further comprising:
copying data stored in the target block to a memory block different from the target block among the plurality of memory blocks, based on a comparison result of the accumulated number of the first sudden power off and a reference number; and
setting the target block as a bad block.

12. The method of claim 9, wherein performing the recovery operation for the first sudden power off comprises:
performing a program operation of storing dummy data in a first erase page consecutive to a page on which the program operation is stopped due to the first sudden power off among a plurality of pages included in the target block; and
performing a program operation of copying data stored in the page on which the program operation is stopped to a second erase page consecutive to the first erase page.

13. The method of claim 12, wherein the page on which the recovery operation is completed is the second erase page.

14. The method of claim 9, further comprising:
reading data stored in a last programmed page among a plurality of pages included in the target block when a second sudden power off is sensed after the first sudden power off; and
performing a recovery operation for the second sudden power off according to whether the read data is the lock data.

15. The method of claim 14, further comprising performing the recovery operation for the second sudden power off when the read data is different from the lock data.

16. The method of claim 14, further comprising:
skipping the recovery operation for the second sudden power off when the read data is the same as the lock data; and
performing a program operation of storing dummy data and write data received from a host in the target block, in response to a write request received from the host after the second sudden power off.

17. A memory controller that controls a memory device including a plurality of memory blocks, the memory controller comprising:
a power manager configured to sense a sudden power off in which power supplied to the memory device is abnormally cut off and generate power abnormality information; and
a program operation controller configured to control the memory device to:
perform a recovery operation for the sudden power off on a target block on which a program operation is stopped due to the sudden power off among the plurality of memory blocks, based on the power abnormality information, and
perform a program operation of storing lock data including information indicating completion of the recovery operation for the sudden power off in a page next to a page on which the recovery operation is completed in the target block.

18. The memory controller of claim 17,
wherein the lock data includes information on an accumulated number of sudden power off occurring during a program operation on the target block after the target block is opened,
further comprising a block manager configured to set the target block as a bad block based on a comparison result of the accumulated number of sudden power off and a reference number, and
wherein the program operation controller is further configured to control the memory device to copy data stored in the target block to a memory block different from the target block among the plurality of memory blocks, based on the comparison result of the accumulated number of sudden power off and the reference number.

19. The memory controller of claim 17,
wherein the recovery operation for the sudden power off includes:
a program operation of storing dummy data in a first erase page consecutive to a page on which the program operation is stopped due to the sudden power off among a plurality of pages included in the target block, and
a program operation of copying data stored in the page on which the program operation is stopped to a second erase page consecutive to the first erase page, and
wherein the page on which the recovery operation is completed is the second erase page.

20. The memory controller of claim 17, wherein the program operation controller is further configured to control, when an additional sudden power off is sensed after the sudden power off, the memory device to perform a recovery operation for the additional sudden power off based on whether data stored in a last programmed page among the plurality of pages included in the target block is the lock data.

* * * * *